Feb. 20, 1940.   C. L. MATTISON   2,191,155
PULLEY SUPPORTING DEVICE
Filed Jan. 9, 1939
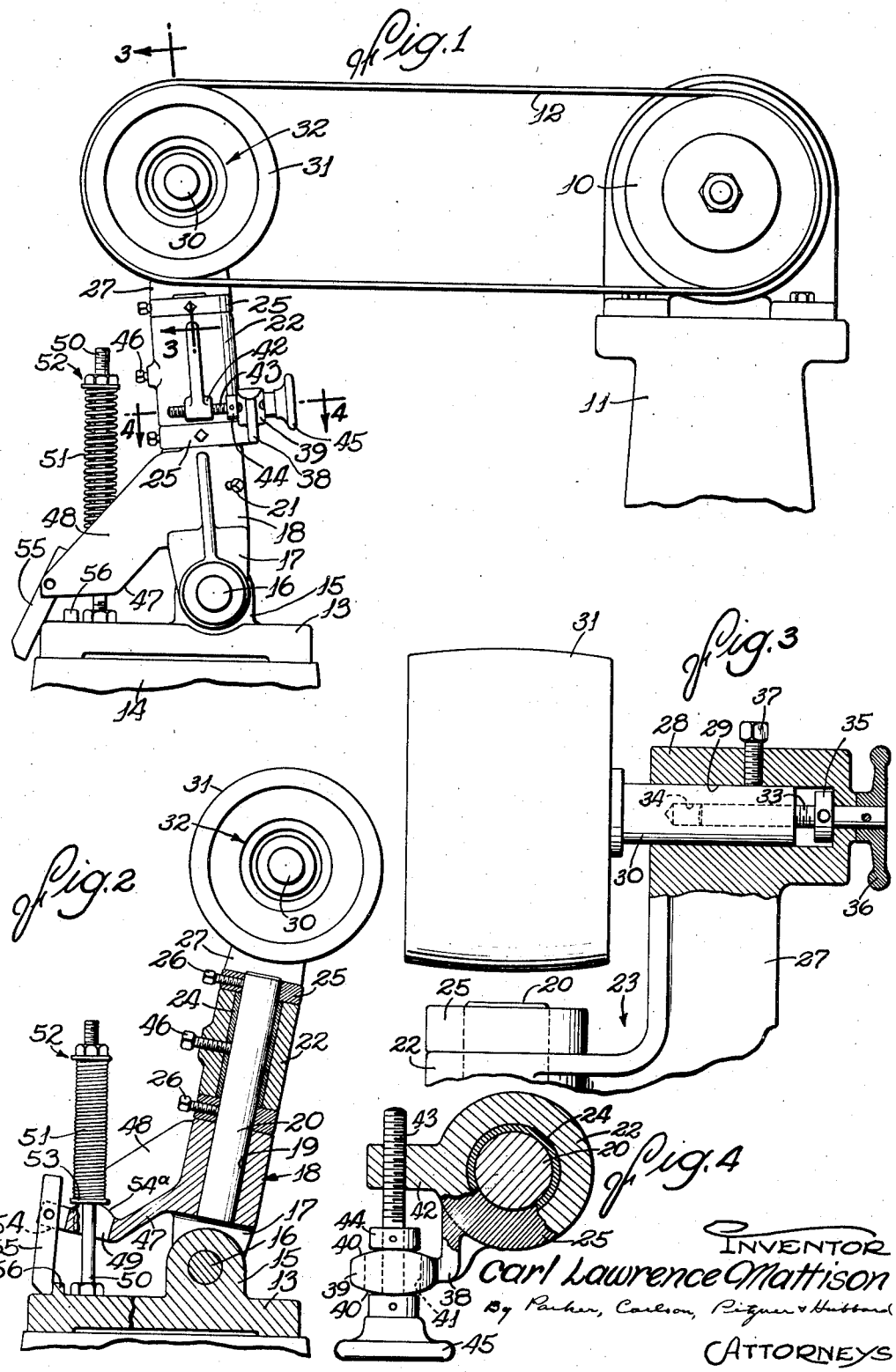
INVENTOR
Carl Lawrence Mattison
By Parker, Carlson, Pigner & Hubbard
ATTORNEYS Patented Feb. 20, 1940

2,191,155

UNITED STATES PATENT OFFICE 2,191,155

PULLEY SUPPORTING DEVICE

Carl Lawrence Mattison, Rockford, Ill., assignor to Mattison Machine Works, Rockford, Ill., a corporation of Illinois Application January 9, 1939, Serial No. 249,991

6 Claims. (Cl. 74—242.15)

The invention relates to pulley supporting devices and a general aim of the invention is to provide a new and improved device of this nature which is of compact construction, is easy to "set up" and adjust, and which is comprised of a few simple castings requiring little machining whereby the device may be manufactured and sold at a relatively low cost.

Another object is to provide, in such a device, novel adjustable relationships which permit the device to be quickly and accurately associated with a cooperating wheel or pulley and include an arm having two parts connected for relative swiveling adjustment on a longitudinal axis, one of the parts being supported for pivotal movement on a transverse axis, the other of said parts supporting the pulley for rotation on an axis substantially parallel to said transverse axis. Provision may also be made for adjustment of the pulley lengthwise of its axis.

Further objects are to provide new and improved means for maintaining an operative tension on an associated belt and in conjunction therewith to provide novel means for rendering the maintaining means inoperative while a belt is being assembled or removed.

Other objects and advantages will become apparent in the following description and from the accompanying drawing, in which:

Figure 1 illustrates in side elevation a pulley supporting device embodying the features of the invention in operative association with a belt and a coacting wheel or pulley.

Fig. 2 is a vertical central sectional view through the device taken on a plane at right angles to the pulley axis.

Figs. 3 and 4 are views on an enlarged scale showing details of assembly and are taken substantially on the lines 3—3 and 4—4 in Fig. 1, respectively.

The present invention will for illustrative purposes be described and considered as being embodied in an idler pulley support adapted for association with the motor driven work wheel 10 (Fig. 1) of a lathe, generally designated 11. In many instances, it may be desirable to convert such machine to the use of an endless abrasive belt 12. The supporting device embodying the present invention enables conversion with minimum difficulty and at relatively little expense. It will, however, be evident that the invention and the several features thereof are well adapted for use in many environments other than this particular one.

The exemplary form of the device herein illustrated comprises a novel arrangement of a wheel or pulley and adjustable means mounting it in proper position to cooperate with the finishing wheel in the support of the endless belt. Referring to the drawing, 13 designates a base arranged to be suitably secured to the floor 14 or other fixed structure. Upstanding from the base is an elongated rib 15 which is horizontally bored to receive a longer shaft 16. Horizontally spaced arms 17 on a swinging frame 18 straddle the ends of the rib 15 and are journaled on the projecting ends of the shaft 16. Intermediate the arms 17, the frame has a vertical bore 19 in which the lower end of a stub shaft 20 is rigidly fixed, as by a set screw 21 (Fig. 1).

The upwardly extending end of the stub shaft rotatably supports an elongated sleeve 22 constituting a part of an idler pulley bracket 23 (Fig. 3). The sleeve may be lined with bearing material 24. The sleeve is maintained against axial movement on the stub shaft by such means as bearing collars 25 held by set screws 26 and disposed one between the lower end face of the sleeve and the frame and the other adjoining the upper end face of the sleeve.

The pulley bracket 23 includes a horizontally offset arm 27 (Fig. 3) connected with the sleeve 22 and dimensioned to extend beyond the upper end of the stub shaft in substantial parallelism with the shaft axis. A head 28 at the upper end of the arm has a horizontal bore 29 opening into the stub shaft side thereof to receive an axle 30 on which a pulley 31 is rotatably supported by antifriction bearings, generally indicated at 32.

It will be noted that this arrangement disposes the pulley directly above and substantially on the axis of its support with the pulley axis approximately intersecting at right angles the axis of the stub shaft. Means are provided for adjusting the position of the pulley relative to its support so that the device as a whole may be alined with the cooperating rotatable member with fair accuracy and the pulley thereafter quickly and precisely adjusted to a proper operating relation. Referring to Fig. 3, an axial adjustment of the pulley is shown as comprising a screw 33 mounted on the closed end of the head 28 for screw threaded engagement with a substantially axial bore 34 in the inner end of the axle 30. The screw is, in this instance, held against other than rotative movement by a collar 35 fixed on the screw inside the head and a handwheel 36 pinned to the screw externally adjacent to the head. Manipulation of the screw by the handwheel will extend or retract the pulley. The final position of adjustment may be fixed, if desired, by a set screw 37 or the like.

The pulley is also adjustable to locate the belt-engaging face thereof in operative parallelism with the belt, this adjustment being effected by rotative movement thereof substantially about the axis of the stub shaft 20. As may be seen in Figs. 1 and 4, the lower one of the bearing collars 25 has an arm 38 extending laterally therefrom and terminating in a head 39 having opposite convex faces 40 and an enlarged aperture 41 traversing the head between said faces. The bracket sleeve 22 has an outstanding member which carries a nut 42 located in spaced alinement to the aperture in the head 39 for engagement by a screw 43. One end of the screw extends through the aperture 41 in the head 39. A collar 44 and a handwheel 45 are fixed to the screw and bear respectively on the inner and outer faces 40 of the head to hold the screw against axial movement. Rotation of the screw shifts the bracket sleeve 22 to adjust the pulley substantially about the axis of the stub shaft. Thus, the operator, having approximately located the device properly with respect to the opposing wheel, and having shifted the pulley axially to center the pulley and the wheel, may effect an angular adjustment of the pulley surface for proper belt engagement without disturbing the other adjustments. A set screw 46 on the bracket sleeve for engagement with the stub shaft may be employed to secure the pulley in its rotatably adjusted position. It will be evident that the sleeve and the lower bearing collar may be rotatably moved as a unit so that the bracket may be located, as desired, on either the right or the left hand side of the device.

A feature of the present construction is the relationship of the pulley adjustments to each other and to the shaft 16 about which the support swivels or rocks. Thus, the rotary adjustment of the pulley is located between the pulley and its pivotal axis and is effected by relative swiveling movement between the two parts of the pulley supporting arm. The position of the pulley may therefore be adjusted independently of the swinging connection avoiding the difficulties which might be present if the rotary adjustment of the pulley also involved shifting the position of the support. Moreover the arrangement readily permits reversal of the pulley support by turning it through 180° to locate the bracket 23 on the right or left hand side of the pulley. As to the axial adjustment of the pulley, the location of the adjusting means between the pulley and the rotary adjusting means permits the axial adjustment to be made without disturbing the position of the rotary adjustment means.

As a further advantage of these relationships, the support may be fashioned as a relatively simple two part casting which requires no accurate machining as would be the case if the entire support were to be mounted for movement to provide the same adjustments.

Means is provided for urging the pulley in a direction which yieldingly maintains the belt taut. Referring to Figs. 1 and 2, the frame 13 has a lateral projection 47 (Figs. 1 and 2) thereon extending generally radially of the pivotal axis of the pulley supporting means. The projection may be reenforced by side members 48 and has an enlarged vertical aperture 49 therein. Secured to the base and extending upwardly through the aperture is a rod 50 which is encircled above the projection by a coil spring 51. The spring is confined between an adjustable nut and washer assembly 52 on the upper end of the rod and a washer 53 loosely carried on the rod for rocking abutment with an arcuate upper surface 54ª formed on the projection. The parts are arranged in assembly to swing the pulley away from the cooperating wheel or on the line of the belt in a belt tightening direction. Hence a yieldable force will be exerted on the belt to maintain it under a desired operating tension. Moreover, the arrangement permits retraction of the pulley to facilitate installation of a belt.

For the convenience of the operator in making a belt installation, means may be provided for holding the pulley in retracted position. To this end, the projection has a pair of outwardly extending fingers 54 pivotally supporting a depending latch member 55 arranged, when the pulley is retracted, to swing by gravity to a vertical position in which the lower end of the latch member rests on the base 13. This position may be suitably determined by such means as a stop lug 56.

From the foregoing description, it will be evident that a new and improved device for adjustably supporting a wheel or pulley and for applying a proper operating tension to a belt engaged thereby has been provided which is constructed primarily of castings requiring little machining and no highly accurate finishing. The device may be quickly installed and adjusted for proper operation with practically any machine requiring the association therewith of a wheel or pulley. The arrangement of the pulley with respect to its axis of rotary adjustment permits the operator readily to make such changes as may be necessary to compensate for irregularities in different belts or to prevent uneven engagement of the pulley and belt which would tend to stretch one side of the belt more than the other. The means for maintaining the belt in a taut condition will respond instantly to take up any slack produced in the belt during use, and the latching means facilitates installation or replacement of a belt.

While the invention is susceptible of various modifications and alternative constructions, I have shown in the drawing and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim as my invention:

1. In a supporting device for a pulley, the combination of a pulley, means for supporting said pulley in operatively spaced relation to a cooperating rotatable element and including a member adjustable about an axis, said pulley being located on the line of said axis and connected with said member for movement therewith to various positions of adjustment.

2. In a pulley supporting device, the combination of pulley supporting means, means for pivotally mounting said supporting means for movement toward and away from a cooperating rotatable element, a pulley mounted on said supporting means for engagement by a belt, and means located between said pulley and the pivotal mounting means for adjusting the position of said pulley about an axis passing through said pulley substantially at right angles to the rotational axis thereof.

3. In a device for supporting a pulley, the combination of a pulley, a support therefor including pivot means permitting said support to swing on the line of a belt engaged by said pulley, means for yieldably urging said support in a belt tightening direction, and means on said support for adjusting said pulley about an axis which passes through said pulley and said support.

4. In a pulley supporting device, the combination of a pulley, supporting means for said pulley including a member adjustable about an axis transverse to the axis of said pulley, and means located between said member and said pulley for adjusting said pulley on the line of its axis, said pulley being located on the axis of adjustment of said member and being connected with said member for movement therewith to various positions of adjustment.

5. A device of the character described having, in combination, a base, a support pivotally mounted on said base for swinging movement on a transverse axis, means for yieldably urging said support in one direction of such movement, said support including a bracket mounted for rotatable adjustment about an axis substantially perpendicular to said transverse axis, a pulley supported on a transverse axis by said bracket and centered approximately on the line of the axis of said bracket, and means between said pulley and said bracket for adjusting said pulley in the direction of its axis.

6. A pulley supporting device having, in combination, a frame mounted for swinging movement on an axis transverse to said frame, a bracket rotatably connected with said frame for relative movement on an axis substantially perpendicular with respect to the transverse axis, a pulley carried by said bracket and disposed on the axial line of bracket movement, means located between said pulley and bracket for axially adjusting said pulley, and means for yieldably urging said frame in one direction of its swinging movement.

CARL LAWRENCE MATTISON.